INVENTORS
CHARLES H. MANION and
THOMAS J. BOYD
BY
HIS ATTORNEYS

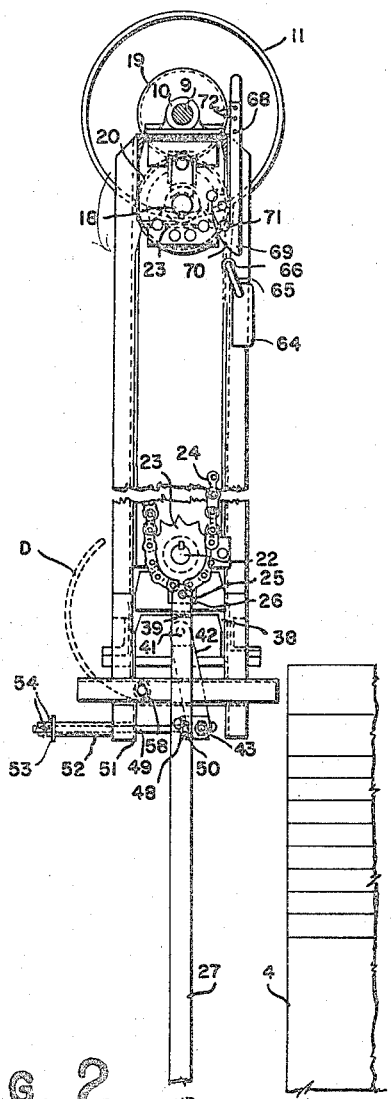
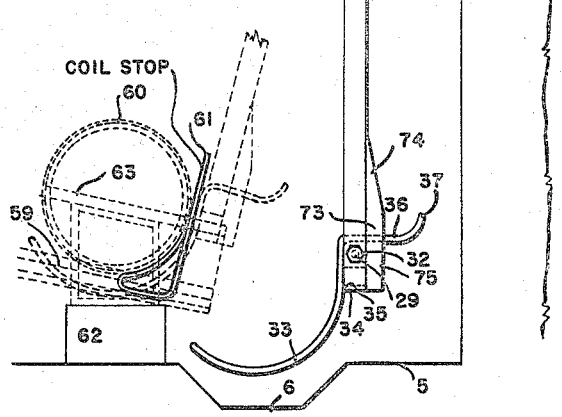

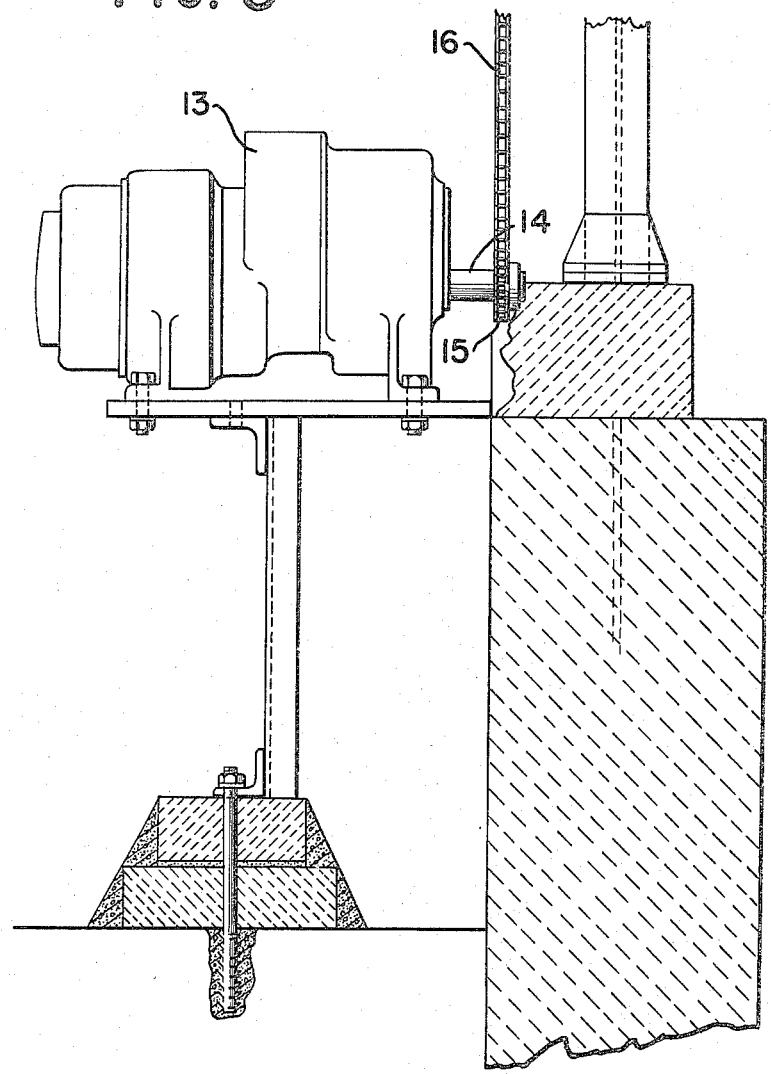

2,733,826
APPARATUS FOR ELEVATING AND DELIVERING ARTICLES

Charles H. Manion, Wellsburg, and Thomas J. Boyd, Cross Creek District, W. Va.

Application August 2, 1952, Serial No. 307,136

19 Claims. (Cl. 214—715)

This invention relates to material handling apparatus, particularly apparatus for elevating and delivering articles. It has to do with apparatus for regularly sequentially handling portions of material from one station to another. Preferably the apparatus is cyclically operable so that it may perform the material handling function in uniform repeated operations with or without periodic manual operation or control.

While apparatus made according to our invention may be adapted for various uses we have found the invention especially well adapted to the handling of bodies of material to remove them from a container and deliver them at a delivery station exteriorly of the container. For purposes of explanation and illustration the invention will be described as embodied in apparatus for delivering bodies of material such as coils of steel strip from a container such as an acid tank. Specifically, we have utilized the invention with great success in removing from an acid tank coils of steel strip such as may be used in the manufacture of metal roofing which is sold in rolls and which is adapted to be laid in strips side by side, the adjacent edges of the strips being seamed together in well known manner.

Our material handling apparatus comprises an elongated carrier oriented generally vertically together with means connected with the carrier for raising and lowering it, a material holder carried by the carrier at the lower portion thereof, means for guiding the carrier in its raising and lowering movements and means cooperating with the material holder at a predetermined point in its movement causing discharge therefrom of material carried thereby. The material holder is preferably connected with the carrier for shifting movement relatively thereto between material holding and material discharging positions and means are preferably provided which engage the material holder at a predetermined point in its movement causing shifting of the material holder from material holding position to material discharging position to discharge material carried thereby.

The elongated carrier is preferably connected with a connecting portion of an operating device whereby the carrier is operated. Such connecting portion of the operating device is desirably movable in a closed path in a generally vertical plane so that upon operation of the operating device the carrier is cyclically operated through successive raising and lowering movements. We find it desirable to pivotally connect the carrier with the connecting portion so that the carrier extends generally downwardly from the connecting portion and to provide guiding means for the carrier positioned at an elevation below the lowest point of the closed path of movement of the connecting portion cooperating with the carrier so that as the carrier is raised and lowered by the operating device its angularity to the vertical changes. This provides for laterally and upwardly swinging movement of the material holder to pick up material disposed at a material supply station, such material being elevated and delivered at a delivery station exteriorly of the container.

The operating device for operating the carrier is preferably an endless operating device trained between supports disposed generally one above the other so that the endless operating device operates substantially in a vertical plane and in an up-and-down direction. Since the carrier is connected with the endless operating device the carrier is cyclically operated through successive raising and lowering movements upon operation of the endless operating device.

The carrier may comprise a pair of opposed carrier members connected with the operating device and extending generally downwardly therefrom together with means connecting the carrier members together so that they operate as a unit. The material holder is preferably disposd between and carried by the carrier members at the lower portions thereof.

The operating device may comprise a pair of spaced apart endless operating elements disposed respectively in generally parallel substantially vertical planes together with means for driving the endless operating elements in synchronism. The spaced apart endless operating elements may be in the form of endless chains. A connector may extend between the endless operating elements and connected with both thereof to be driven thereby in a cyclic path. The carrier may be connected with the connector so as to be operated thereby.

As above mentioned, the material holder carried by the carrier may be connected therewith for shifting movement relatively thereto between material holding and material discharging positions. An operating member may be connected with the means for guiding the carrier in its raising and lowering movements, the operating member extending into the path of a portion of the material holder during raising of the carrier adapted to engage the material holder and thereby cause shifting of the material holder from material holding position to material discharging position to discharge material elevated thereby. Desirably the material holder has a projecting operating portion and a detent is disposed in the path of such portion of the material holder during raising of the carrier to engage the projecting operating portion and thereby cause shifting of the material holder from material holding position to material discharging position.

We preferably position guides at opposite faces of the carrier cooperating with the carrier determining its angularity as the connecting device moves in its closed path in a generally vertical plane whereby the lower portion of the carrier when the connecting portion is near the bottom of the closed path swings laterally and upwardly to enable the material holder to pick up material disposed at a material supply station.

While our material handling apparatus may operate continuously so as to automatically perform the material handling function in uniform repeated operations without the necessity of manual operation or control, it may be desirable under certain circumstances to provide means automatically rendering inoperative the carrier moving or operating means at a predetermined point in the movement of the carrier to cause the carrier to dwell until the operating means is again rendered operative either automatically or in the discretion of the operator. This means for automatically rendering inoperative the operating means may, for example, take the form of a limit switch in the path of movement of a portion of the apparatus adapted to be operated when the carrier is in a predetermined position. For example, when the apparatus is used for removing material such as coils of steel from a tank of liquid such as acid it is desirable to bring the carrier to a stop for a brief period when each coil has been elevated above the level of the acid in the tank to afford an opportunity for acid clinging to the coil to drain back into the tank before the coil is delivered over the side of the tank.

When we employ means as above referred to automatically rendering inoperative the operating means for the carrier we preferably also provide means automatically operative during a dwell of the carrier limiting retrograde movement of the carrier. Such means may take the form of pivoted hook means in the path of movement of a portion of the apparatus automatically operative during a dwell of the carrier to limit retrograde movement thereof. For example, two hooks may be employed, one at each side of the center line of the carrier, which hang down from their pivots and have inclined lower surfaces so that as a coil is elevated to a position above the level of the acid in the tank a portion of the carrier rides up along the inclined lower surfaces of the hooks and causes the hooks to pivot laterally and ultimately drop back by gravity into their normal positions. The operating means is rendered inoperative at about the time when the hooks drop back, and the hooks hookingly engage and support a portion of the carrier when the carrier tends to move in the retrograde direction, i. e., downwardly. The carrier may move downwardly a short distance before the portion thereof adapted to be engaged by the hooks seats in the throats of the hooks but such downward movement is slight, normally not amounting to more than an inch or two. When such means are employed it is unnecessary to provide other more complex or expensive means such as a magnetic brake on the motor shaft to prevent retrograde movement of the carrier during dwells.

Reference has been made above to the guiding means for the carrier positioned at an elevation below the lowest point of the path of movement of the operating device cooperating with the carrier so that as the carrier is raised and lowered by the operating device its angularity to the vertical changes. We preferably provide means for altering the lateral position of the guiding means to predeterminedly control the angularity of the carrier. This greatly increases the utility of the apparatus, rendering a standard apparatus adaptable for use in different tank installations where the lateral distances between the various elements of the respective installations may vary substantially.

Other details, objects and advantages of the invention will become apparent as the following description of a present preferred embodiment thereof proceeds.

In the accompanying drawings we have shown a present preferred embodiment of the invention in which Figure 1 is a fragmentary elevational face view of material handling apparatus showing a portion of the structure in vertical cross section;

Figure 2 is a fragmentary elevational edge view of the material handling apparatus shown in Figure 1 showing a portion of the structure in vertical cross section;

Figure 3 is a fragmentary elevational view partly in vertical cross section showing a portion of the structure.

Figure 1:
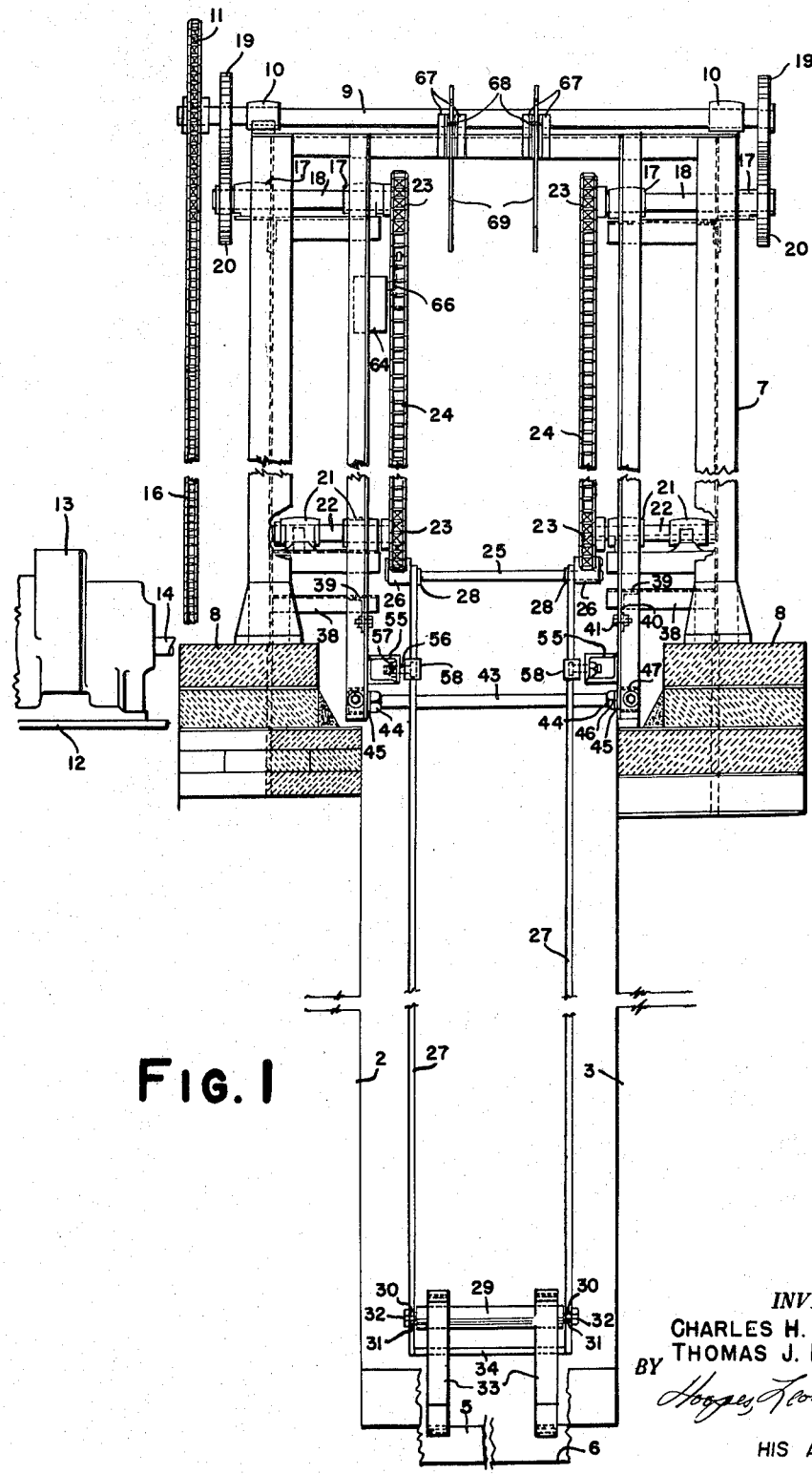
Figure 4:
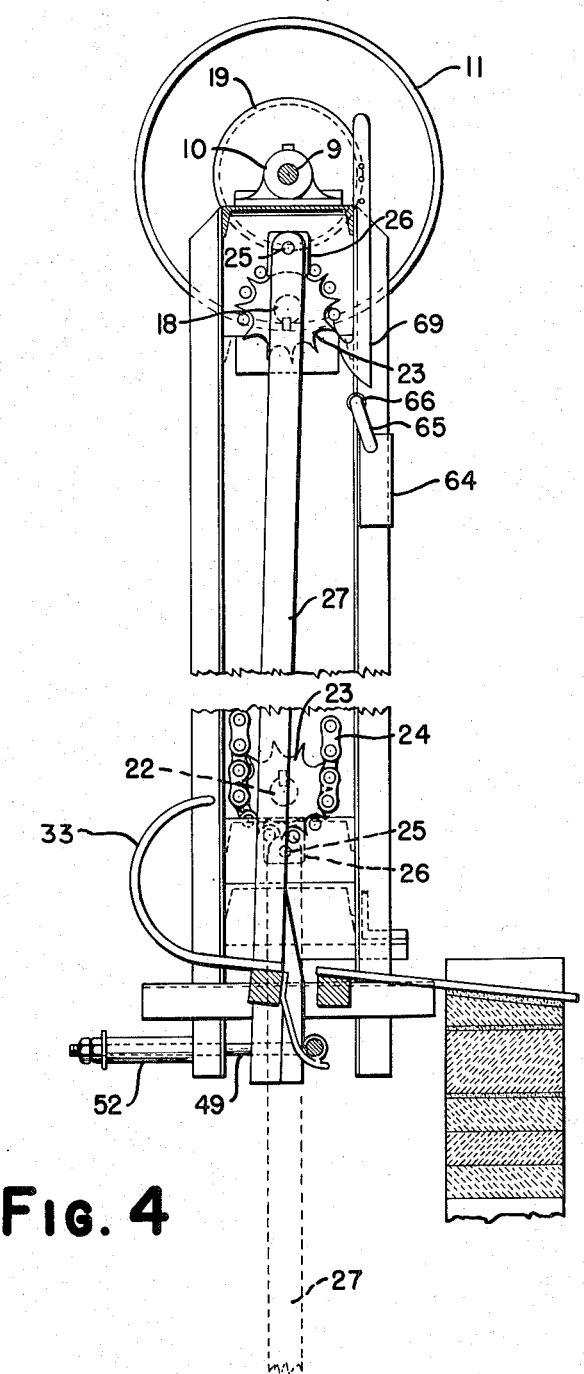
Figure 4 is a view similar to Figure 2 but to larger scale and showing the coil supports in discharge position.

Referring now more particularly to the drawings, there is provided an acid tank having side walls 2 and 3 (Figure 1), end walls one of which is shown at 4 (Figure 2) and a bottom 5 (Figures 1 and 2). The bottom 5 has therein a downward depression or well 6 to accommodate the material holder during the operative movements which will be described.

Bridging the acid tank in a direction normal to the side walls 2 and 3 is a superstructure designated generally by reference numeral 7 mounted upon foundation blocks 8 at opposite sides of the tank. Journaled in the superstructure 7 at the top thereof is a shaft 9 extending completely across the tank. The journals for the shaft 9 are shown at 10. At one end the shaft 9 has fastened thereto a sprocket 11. Mounted upon a support 12 at one side of the superstructure and adjacent the bottom thereof is an electric motor and speed reducer unit 13 whose shaft 14 carries a sprocket 15 disposed directly beneath the sprocket 11. A sprocket chain 16 is trained about and meshes with the sprockets 11 and 15 as shown in Figures 1 and 3. Thereby the motor drives the shaft 9 unidirectionally and either continuously or intermittently as desired; means providing for intermittent operation are hereinafter disclosed. The shaft 9 turns in the clockwise direction viewing Figure 2.

Journaled in bearings 17 in the superstructure are two opposed shafts 18 which are coaxial and disposed directly below the shaft 9. The respective shafts 18 are disposed generally at opposite sides of the tank but their inner ends, i. e., the ends of the shafts 18 which are nearer each other, project over the tank. Fastened to the shaft 9 adjacent the respective ends thereof are spur gears 19, and fastened to the respective shafts 18 are spur gears 20, the respective spur gears 20 lying beneath the respective spur gears 19 and meshing therewith so that the shaft 9 drives synchronously the two shafts 18, the shafts 18 being driven to turn in the counterclockwise direction viewing Figure 2.

Directly beneath the respective shafts 18 and journaled for rotation in bearings 21 in the superstructure are shafts 22. Fastened to the inner end of each of the four shafts 18, 18, 22, 22 is a sprocket 23. The sprockets 23 are arranged in opposed pairs, the two upper sprockets 23 being coaxial and operating in parallel vertical planes and the two lower sprockets 23 likewise being coaxial and operating respectively in the same vertical planes as the corresponding upper sprockets 23, and the common axis of the lower sprockets is disposed directly below and parallel to the common axis of the upper sprockets. A sprocket chain 24 is trained about and meshes with each vertically aligned pair of sprockets 23. Through the mechanism above described the two sprocket chains 24, which constitute a portion of the operating device for the carrier presently to be described, operate synchronously in the counterclockwise direction viewing Figure 2.

Extending between the chains 24 and connected with both thereof so as not to interfere with meshing of the chains with the sprockets 23 is a connector 25 in the form of a round rod. The connector 25 is connected with the respective chains 24 through suitable brackets 26.

Pivotally carried by the connector 25 and extending downwardly therefrom are two opposed elongated carrier members 27. Collars 28 pinned to the connector 25 maintain the upper ends of the opposed carrier members 27 against the inner faces of the brackets 26. The lower ends of the carrier members 27 are connected together by a rod 29 having reduced threaded extremities 30 which pass through circular holes 31 in the respective carrier members 27 and have nuts 32 applied thereto outside the outer members. The nuts 32 are not drawn up tightly so as to closely confine the carrier members between the shoulders of the rod 29 and the nuts since the rod 29 must be adapted for turning movement relatively to the carrier members 27 as will presently appear. The reduced threaded extremities of the rod 29 may be threaded for only a predetermined limited distance inwardly from their ends, thus limiting the extent to which the nuts 32 can be turned up thereon and allowing for sufficient clearance between the shoulders of the rod 29 and the nuts to prevent binding thereof on the carrier members 27 when turning of the rod 29 relatively to the carrier members is necessary in operation of the apparatus.

Connected with the rod 29 are a plurality of coil supports 33, two such supports being shown but any appropriate number being used. The respective coil supports 33 are of the same shape, each being concave so that together they form a coil supporting cradle or scoop. They are welded or otherwise suitably attached to the rod 29 in the same angular position. Thus in both the full line showing and the broken line showings of Figure 2 the edge view of one of the coil supports 33 shows also the position of the other thereof.

A bar 34 extends transversely between the carrier members 27 at the bottoms thereof and is connected to both of the carrier members. Since the coil supports 33 have by far the greater portion of their mass disposed to the left of the axis of the rod 29 viewing Figure 2 the rod 29 tends to turn by gravity relatively to the carrier members 27 until portions 35 of the coil supports 33 come to rest against the bar 34 as shown at the bottom of Figure 2. Each of the coil supports 33 has an arm 36 which projects to the right therefrom viewing Figure 2 and has a generally upwardly curved end portion 37. The coil supports 33 together with the rod 29 carrying them constitute a material or coil holder pivoted to the carrier and turnable about the pivotal connection between material holding position as shown at the bottom of Figure 2 and material discharging position as shown higher up in Figure 2 and as will presently be described.

The superstructure 7 includes at each side of the tank a horizontally disposed channel 38. Welded to the under surface of the web of each channel 38 is an angle bracket 39 having a downwardly projecting flange 40. Each of the downwardly projecting flanges 40 of the angle brackets 39 has pivoted thereto at 41 by a bolt and nut a generally downwardly extending link 42. The two links 42 have circular openings adjacent their lower ends through which a rod 43 passes. The ends of the rod 43 are threaded. Each end of that rod has threaded thereon inside the corresponding link 42 a nut 44. Outside each nut 44 an angle bracket 45 has one flange 46 provided with a circular hole receiving the rod 43. The corresponding link 42 lies next to the flange 46 and a nut 47 is applied to the end of the rod 43 and tightened up against the link. The structure is the same at both ends of the rod 43. Each angle bracket 45 has another flange 48 provided with a circular opening through which passes a bolt 49. The heads 50 of the respective bolts 49 are disposed to the right of the respective flanges 48 of the angle brackets 45 viewing Figure 2. Each of the bolts 49 projects to the left viewing Figure 2 from the corresponding angle bracket 45 and passes through an opening 51 in an upright member of the superstructure. To the left thereof viewing Figure 2 each bolt 49 has a sleeve 52 disposed thereabout and has a washer 53 and two nuts 54 applied to the end thereof.

By the structure just described the operative lateral position of the rod 43 viewing Figure 2 can be adjusted. When the rod 43 is operative the right-hand end of each sleeve 52 abuts the upright member through which the corresponding bolt 49 passes, thus limiting the distance to the right thereof viewing Figure 2 at which the rod 43 may be positioned. Adjustment of the nuts 54 on the respective bolts 49 correspondingly adjusts the operative position of the rod 43. If the parts are loose the links 42 may swing down to generally vertical position with corresponding leftward movement of the bolts 49 when no rightward pressure is applied on the rod 43, but the pivotal connections 41 of the links 42 to the flanges 40 of the brackets 39, shown as being effected by bolts, may cause sufficient binding that the links 42 will remain in their inclined positions as shown in Figure 2 even when no rightward pressure viewing that figure is exerted on the rod 43. Since the only function of the rod 43 as will presently be described is to offer leftward resistance viewing Figure 2 to rightward pressure exerted thereon by the carrier members 27 it is immaterial what position the rod occupies when no rightward pressure is being exerted thereon. As the carrier members 27 move upwardly they lie against the left-hand side of the rod 43 which determines their angularity as will presently be described.

Welded to the superstructure are generally box-shaped brackets 55, one at each side thereof. Passing through each of such brackets is a horizontally oriented stud 56 held in place by a nut 57, each stud carrying at its outer extremity a roller 58. The respective rollers 58 lie behind the respective carrier members 27, i. e., at the opposite sides of the respective carrier members from the rod 43. The rollers 58 also serve as guide means for the carrier members as will presently be described.

In the bottom of the tank are inclined rails 59 down which coils 60 are adapted to roll, stationary stops 61 being disposed at the lower ends of the rails but intermediate the coil supports 33. The lower ends of the rails 59 are disposed well above the bottom of the tank, being supported upon spacers 62. The spacers 62, like the stops 61, are disposed out of longitudinal alignment with the coil supports 33 so that during operation of the apparatus the coil supports 33 may pass between the spacers 62, the rails 59 and the stops 61 to lift coils 60 from position against the stops 61 and deliver them out of the tank as will presently be described. The coils 60 are held against endwise movement in the tank by end guides 63.

In the control circuit for the motor 13 is a limit switch 64 having a pivoted switch operating arm 65 carrying at its extremity a roller 66. The roller is disposed in the path of movement of one of the brackets 26 (the left hand such bracket viewing Figure 1). Since the chains 34 operate in the counterclockwise direction viewing Figure 2 and since the limit switch 64 is positioned adjacent the right-hand reach of one of those chains it follows that the limit switch will be operated when the above-mentioned bracket 26 is nearing the top of its travel, which will be when the coil supports 33 have lifted a coil to an elevation above the level of the acid in the tank.

Mounted at the top of the superstructure 7 are two pairs of vertically oriented angle members 67. The angle members of each pair are disposed with their adjacent flanges parallel and slightly spaced apart as shown in Figure 1. Pivoted between those flanges of each of the pairs of angle members 67 upon a pivot pin 68 is a hook 69 having an inclined lower surface 70 and a throat 71. As shown two such hooks are provided, one at each side of the center line of the apparatus. Provision is made for raising or lowering the hooks by providing each of them with a plurality of pivot pin receiving holes 72 as shown in Figures 1 and 2. The hooks are shown in their uppermost positions, i. e., with the pivot pins 68 in the lowermost holes in the respective hooks.

The hooks are disposed in the path of movement of the connector 25 as it moves upwardly at the right-hand side of the apparatus viewing Figure 2. The connector engages the inclined surfaces 70 of the hooks and thus causes the hooks to pivot in the counterclockwise direction about the axis of the pivot pin 68 viewing Figure 2 until the connector 25 has risen to a level above the tops of the surfaces 70 at which time the hooks swing back by gravity into the position shown in Figure 2. By that time the upward movement of the connector 25 will have stopped and upon slight retrograde or downward movent of the connector under the influence of the mass of the carrier and the coil carried thereby the connector settles into the throats 71 of the hooks and the downward movement of the carrier is thus limited and the carrier firmly held in its dwell position. The hooks will hold the carrier in that position until the motor 13 is again operated to raise the carrier. The motor 13 may be under manual control or under automatic control. The operator may close a switch when it is desired to resume upward movement of the drained coil, or such upward movement may be resumed by an automatic circuit closing device.

Welded to the right-hand face viewing Figure 2 of each of the carrier members 27 adjacent the bottom thereof is an elongated plate 73. The plate 73 has at its upper portion an inclined face 74 and at its lower portion a face 75 which extends generally parallel to the length of the member 27. The inclined face 74 is disposed entirely above the level of the arm 36. The purpose of providing the plates 73 will become apparent in the description of operation of the apparatus to follow.

A cycle of operations of the material handling apparatus will now be described. The tank contains acid to a level such that most or all of the coils disposed on the rails 59 are completely covered with acid. A number of coils 60 are positioned on the rails, the coils being in contact with each other so that when the lowermost coil is removed the coils above it will roll down on the rails 59 by gravity, each coil thus advancing one position downwardly along the rails. As the connector 25 moves downwardly at the left-hand reach of the chains 24 viewing Figure 2 the carrier members 27 will be tilted slightly so that their lower ends are somewhat to the right of the solid line position of Figure 2, such tilting being caused by engagement of the rollers 58 with the carrier members 27. As the connector 25 reaches the bottom of its cycle of movement as shown in solid lines in Figure 2 the carrier members 27 extend straight downwardly and are in contact with the rod 43. As the connector 25 begins to move upwardly at the right-hand reach of the chains 24 viewing Figure 2 the carrier members 27 are gradually tilted and at the same time raised so that the coil supports 33 move from the solid line position to the broken line position of Figure 2 in a lateral and upward swing whereby to take the bottom coil 60 off of the rails 59. As the connector 25 moves upwardly the coil which has been taken is lifted up out of the acid and gradually raised to a position above the top of the wall of the tank. As soon as that coil is out of the way the other coils roll down the rails as above described until the lower coil is against the stops 61.

As the connector 25 rises the bracket 26 referred to above engages the roller 66 and opens the limit switch 64. Opening of the limit switch 64 deenergizes the motor 13. There is some upward travel of the carrier after deenergization of the motor due to inertia. The hooks 69 are disposed at an elevation such that when the connector 25 comes to a stop it will be at an elevation just above the tops of the inclined lower surfaces 70 of the hooks 69. The connector 25 engages the surfaces 70 and swings the hooks 69 to the right viewing Figure 2 until the connector has risen to an elevation above the upper extremities of the surfaces 70. At that time the hooks 69 swing back by gravity to the position shown in Figure 2 and the connector 25 settles into the throats of the hooks as above explained.

The carrier remains at dwell until the motor 13 is reenergized when upward movement of the carrier is resumed. As the connector 25 approaches the top of its travel the inclined surfaces 74 of the plates 73 engage the rod 43 and finally the arms 36 engage the rod 43, such engagement causing the holder consisting of the rod 29 and the coil supports 33 to be tilted into coil discharging position as shown at D in Figure 2, whereupon the coil is discharged toward the right viewing Figure 2. The purpose of the plates 73 is to provide a greater lever arm for operation of the coil supports 33 than would be provided if the rod 43 engaged the arms 36 immediately adjacent the right-hand edges of the carrier members 27. A smoother operation is brought about by use of the plates 73 and less power is required to dump the coils.

When a coil is dumped or discharged as above described it rolls out of the coil supports 33 onto a suitable ramp or support which does not constitute the present invention and hence is not shown in the drawings. As the connector 25 passes its extreme upward position the carrier members 27 pass a generally vertical position and on the downward movement of the connector 25 the carrier members 27 lie against the rollers 58. Thus the rollers 58 determine the inclination or angularity of the carrier members 27 on the down stroke while the rod 43 determines the inclination or angularity of the carrier members 27 on the up stroke. As the carrier members start down from their uppermost position they are tilted with their lower ends toward the right viewing Figure 2 to insure against fouling of the coil supports 33 against the lowermost coil on the down stroke of the carrier members. When the carrier members are in their lowermost position they are substantially vertical as shown in solid lines in Figure 2. As they being their upward movement the rod 43 swings the lower portions of the carrier members carrying the coil supports to the left and upwardly so that they scoop up, as it were, the lowermost coil 60. The cycle may be repeated indefinitely as long as coils are supplied on the rails 59.

While we have shown and described a present preferred embodiment of the invention it is to be distinctly understood that the invention is not limited thereto but may be otherwise variously embodied within the scope of the following claims.

We claim:

1. Material handling apparatus comprising an elongated carrier oriented generally vertically, means connected with the carrier for raising and lowering it, a material holder carried by the carrier at the lower portion thereof and comprising generally horizontally spaced apart material holding members and a cross member rigidly connecting the material holding members together, means for guiding the carrier in its raising and lowering movements and means cooperating with the material holder at a predetermined point in its movement moving the same to cause discharge therefrom of material carried thereby.

2. Material handling apparatus comprising an elongated carrier oriented generally vertically, means connected with the carrier for raising and lowering it, a material holder carried by the carrier at the lower portion thereof and connected with the carrier for shifting movement relatively thereto between material holding and material discharging positions, means for guiding the carrier in its raising and lowering movements including means positioned to engage the carrier as it is raised to tilt it and means engaging the material holder at a predetermined point in its movement causing shifting of the material holder from material holding position to material discharging position to discharge material carried thereby.

3. Material handling apparatus comprising an elongated carrier oriented generally vertically, an operating device having a connecting portion movable in a closed path in a generally vertical plane, which closed path is of substantially greater vertical than horizontal extent, the carrier being connected with the connecting portion whereby upon operation of the operating device the carrier is cyclically operated through successive raising and lowering movements, a material holder carried by the carrier at the lower portion thereof, guide means for guiding the carrier in its raising and lowering movements, the guide means being positioned generally beneath and closely adjacent the closed path of movement of the operating device, and means cooperating with the material holder upon generally upward movement of the carrier causing discharge therefrom of material elevated thereby.

4. Material handling apparatus comprising an elongated carrier oriented generally vertically, an endless operating device trained between supports disposed generally one above the other so that the endless operating device operates substantially in a vertical plane and in an up-and-down direction, the carrier being connected with the endless operating device whereby upon operation of the endless operating device the carrier is cyclically operated through successive raising and lowering movements, a material holder carried by the carrier at the lower portion thereof, guide means for guiding the carrier in its raising and lowering movements, the guide means being positioned generally beneath and closely adjacent the path of movement of the endless operating device, and means cooperating with the material holder upon generally upward movement of the carrier causing discharge therefrom of material elevated thereby.

5. Material handling apparatus comprising an endless operating device operable in a generally vertical plane, a pair of opposed carrier members connected with the endless operating device and extending generally downwardly therefrom, means connecting the carrier members together so that they operate as a unit, a material holder disposed between and carried by the carrier members at the lower portions thereof, guide means for guiding the carrier members in their raising and lowering movements, the guide means being positioned generally beneath and closely adjacent the path of movement of the endless operating device, and means cooperating with the material holder upon generally upward movement of the carrier members causing discharge from the material holder of material elevated thereby.

6. Material handling apparatus comprising a pair of spaced apart endless operating elements disposed respectively in generally parallel substantially vertical planes, means for driving the endless operating elements in synchronism, a pair of opposed carrier members connected with the operating elements, the carrier members extending generally downwardly relatively to the operating elements, means connecting the carrier members together so that they operate as a unit, a material holder disposed between and carried by the carrier members at the lower portions thereof, guide means for guiding the carrier members in their raising and lowering movements, the guide means being positioned generally beneath and closely adjacent the path of movement of the endless operating elements, and means cooperating with the material holder upon generally upward movement of the carrier members causing discharge from the material holder of material elevated thereby.

7. Material handling apparatus comprising a pair of spaced apart endless chains disposed respectively in generally parallel substantially vertical planes, means for driving the endless chains in synchronism, a connector extending between the endless chains and connected with both thereof to be driven thereby in a cyclic path, an elongated carrier oriented generally vertically and connected with the connector, a material holder carried by the carrier at the lower portion thereof, guide means for guiding the carrier in its raising and lowering movements, the guide means being positioned generally beneath and closely adjacent the path of movement of the endless chains, and means cooperating with the material holder upon generally upward movement of the carrier causing discharge therefrom of material elevated thereby.

8. Material handling apparatus comprising an elongated carrier oriented generally vertically, means connected with the carrier for raising and lowering it, a material holder pivoted to the carrier for turning movement between material holding and material discharging positions and a member guiding the carrier in its raising and lowering movements and engaging the material holder upon generally upward movement of the carrier causing turning of the material holder from material holding position to material discharging position to discharge material elevated thereby.

9. Material handling apparatus comprising an elongated carrier oriented generally vertically, means connected with the carrier for raising and lowering it, a material holder carried by the carrier and connected therewith for shifting movement relatively thereto between material holding and material discharging positions, means for guiding the carrier in its raising and lowering movements and an operating member connected with the guiding means and extending into the path of a portion of the material holder during raising of the carrier adapted to engage the material holder and thereby cause shifting of the material holder from material holding position to material discharging position to discharge material elevated thereby.

10. Material handling apparatus comprising an elongated carrier oriented generally vertically, means connected with the carrier for raising and lowering it, a material holder carried by the carrier and connected therewith for shifting movement relatively thereto between material holding and material discharging positions, the material holder having a projecting operating portion, means for guiding the carrier in its raising and lowering movements and a detent disposed in the path of the operating portion during raising of the carrier adapted to engage the operating portion and thereby cause shifting of the material holder from material holding position to material discharging position to discharge material elevated thereby.

11. Material handling apparatus comprising an operating device having a connecting portion movable in a closed path in a generally vertical plane, an elongated carrier oriented generally vertically pivotally connected with the connecting portion and extending generally downwardly therefrom, a material holder carried by the carrier at the lower portion thereof, guides positioned at opposite faces of the carrier cooperating with the carrier determining its angularity as the connecting portion moves in said closed path whereby the lower portion of the carrier when the connecting portion is near the bottom of the closed path swings laterally and upwardly to enable the material holder to pick up material disposed at a material supply station and means cooperating with the material holder upon generally upward movement of the carrier causing discharge therefrom of material elevated thereby from the material supply station.

12. Material handling apparatus comprising an operating device having a connecting portion movable in a closed path in a generally vertical plane, an elongated carrier oriented generally vertically pivotally connected with the connecting portion and extending generally downwardly therefrom, a material holder carried by the carrier at the lower portion thereof and connected with the carrier for shifting movement relatively thereto between material holding and material discharging positions, guides positioned at opposite faces of the carrier cooperating with the carrier determining its angularity as the connecting portion moves in said closed path whereby the lower portion of the carrier when the connecting portion is near the bottom of the closed path swings laterally and upwardly to enable the material holder to pick up material disposed at a material supply station and means engaging the material holder upon generally upward movement of the carrier causing shifting of the material holder from material holding position to material discharging position to discharge therefrom material elevated thereby from the material supply station.

13. Material handling apparatus comprising an elongated carrier oriented generally vertically, an endless operating device trained between supports disposed generally one above the other so that the endless operating device operates substantially in a vertical plane and in an up-and-down direction, the carrier being connected with the endless operating device whereby upon operation of the endless operating device the carrier is cyclically operated through successive raising and lowering movements, a material holder pivoted to the carrier at the lower portion thereof for turning movement between material holding and material discharging positions, means for guiding the carrier in its raising and lowering movements and means engaging the material holder upon generally upward movement of the carrier causing turning of the material holder from material holding position to material discharging position to discharge material elevated thereby.

14. Material handling apparatus comprising an operating device having a connecting portion movable in a closed path in a generally vertical plane, an elongated carrier oriented generally vertically pivotally connected with the connecting portion and extending generally downwardly therefrom, a material holder carried by the carrier at the lower portion thereof pivotally connected with the carrier for turning movement between material holding and material discharging positions, guides positioned at opposite faces of the carrier cooperating with the carrier determining its angularity as the connecting portion moves in said closed path whereby the lower portion of the carrier when the connecting portion is near the bottom of the closed path swings laterally and upwardly to enable the material holder to pick up material disposed at a material supply station and means engaging the material holder upon generally upward movement of the carrier causing turning of the material holder from material holding position to material discharging position to discharge therefrom material elevated thereby from the material supply station.

15. Material handling apparatus comprising an operating device having a connecting portion movable in a closed path in a generally vertical plane, a pair of opposed carrier members connected with the connecting portion, the carrier members extending generally downwardly from the connecting portion, means connecting the carrier members together so that they operate as a unit, a material holder disposed between and carried by the carrier members at the lower portions thereof pivotally connected therewith for turning movement between material holding and material discharging positions, guides positioned at opposite faces of the carrier members cooperating with the carrier members determining their angularity as the connecting portion moves in said closed path whereby the lower portions of the carrier members when the connecting portion is near the bottom of the closed path swing laterally and upwardly to enable the material holder to pick up material disposed at a material supply station and means engaging the material holder upon generally upward movement of the carrier members causing turning of the material holder from material holding position to material discharge position to discharge therefrom material elevated thereby from the material supply station.

16. Material handling apparatus comprising an elongated carrier oriented generally vertically, means connected with the carrier for raising and lowering it, a material holder carried by the carrier at the lower portion thereof, means for guiding the carrier in its raising and lowering movements, means cooperating with the material holder at a predetermined point in its movement causing discharge therefrom of material carried thereby and means automatically rendering inoperative the first mentioned means at a predetermined point in its movement to cause the material carrier to dwell until the first mentioned means is again rendered operative.

17. Material handling apparatus comprising an elongated carrier oriented generally vertically, means connected with the carrier for raising and lowering it, a material holder carried by the carrier at the lower portion thereof, means for guiding the carrier in its raising and lowering movements, means cooperating with the material holder at a predetermined point in its movement causing discharge therefrom of material carried thereby, means automatically rendering inoperative the first mentioned means at a predetermined point in its movement to cause the material carrier to dwell until the first mentioned means is again rendered operative and means automatically operative during a dwell of the material carrier limiting retrograde movements of the material carrier.

18. Material handling apparatus comprising an elongated carrier oriented generally vertically, means connected with the carrier for raising and lowering it, a material holder carried by the carrier at the lower portion thereof, means for guiding the carrier in its raising and lowering movements, means cooperating with the material holder at a predetermined point in its movement causing discharge therefrom of material carried thereby, means automatically rendering inoperative the first mentioned means at a predetermined point in its movement to cause the material carrier to dwell until the first mentioned means is again rendered operative and pivoted hook means in the path of movement of a portion of the apparatus automatically operative during a dwell of the material carrier to limit retrograde movement of the material carrier.

19. Material handling apparatus comprising an elongated carrier oriented generally vertically, an operating device having a connecting portion movable in a closed path in a generally vertical plane, the carrier being pivotally connected with the connecting portion and extending generally downwardly therefrom, guiding means for the carrier positioned at an elevation below the lowest point of said closed path cooperating with the carrier so that as the carrier is raised and lowered by the operating device its angularity to the vertical changes, a material holder carried by the carrier at the lower portion thereof, means cooperating with the material holder at a predetermined point in its movement causing discharge therefrom of material carried thereby and means for altering the lateral position of the guiding means to predeterminedly control the angularity of the carrier.

References Cited in the file of this patent

UNITED STATES PATENTS

| Number | Name | Date |
|---|---|---|
| 748,545 | Troehler | Dec. 29, 1903 |
| 856,996 | Custer et al. | June 11, 1907 |
| 963,478 | Shelly | July 5, 1910 |
| 1,760,509 | Marvel | May 27, 1930 |
| 1,776,414 | Carlson | Sept. 23, 1930 |
| 2,125,547 | Coughlin | Aug. 2, 1938 |
| 2,172,386 | Huff | Sept. 12, 1939 |
| 2,261,178 | Nyberg | Nov. 4, 1941 |
| 2,421,365 | Patrick | May 27, 1947 |
| 2,555,574 | Crawford | June 5, 1951 |
| 2,603,372 | Ketchpel | July 15, 1952 |
| 2,649,983 | Finlay et al. | Aug. 25, 1953 |
| 2,671,861 | Bullard III | Mar. 9, 1954 |
| 2,682,404 | Lund | June 29, 1954 |